United States Patent
Jeong

(10) Patent No.: US 10,391,858 B2
(45) Date of Patent: Aug. 27, 2019

(54) ACTIVE AIR FLAP ASSEMBLY WITH IMPROVED SEALING PERFORMANCE

(71) Applicants: HYUNDAI MOTOR COMPANY, Seoul (KR); KIA MOTORS CORPORATION, Seoul (KR)

(72) Inventor: Ji-Min Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/835,159

(22) Filed: Dec. 7, 2017

(65) Prior Publication Data
US 2019/0061515 A1 Feb. 28, 2019

(30) Foreign Application Priority Data
Aug. 28, 2017 (KR) .................. 10-2017-0108580

(51) Int. Cl.
B60K 11/08 (2006.01)
B60K 11/04 (2006.01)

(52) U.S. Cl.
CPC .................. B60K 11/085 (2013.01)

(58) Field of Classification Search
CPC ....... B60K 11/085; B60K 11/04; B60K 11/08; B60K 2001/0411; B60R 19/52; B60R 2019/525; B60R 2019/527; F01P 5/06
See application file for complete search history.

(56) References Cited

U.S. PATENT DOCUMENTS

| | | | |
|---|---|---|---|
| 2006/0060401 A1* | 3/2006 | Bole | B60K 11/085 |
| | | | 180/68.1 |
| 2013/0126253 A1* | 5/2013 | Saito | B60K 11/085 |
| | | | 180/68.1 |
| 2016/0059688 A1* | 3/2016 | Kim | B60K 11/085 |
| | | | 180/68.1 |
| 2017/0001514 A1* | 1/2017 | Watari | B60R 19/52 |
| 2017/0326971 A1* | 11/2017 | Cosmo | B60R 19/52 |

FOREIGN PATENT DOCUMENTS

KR 10-2015-0070769 A 6/2015

* cited by examiner

*Primary Examiner* — Long T Tran
(74) *Attorney, Agent, or Firm* — Morgan, Lewis & Bockius LLP

(57) ABSTRACT

An active air flap assembly with improved sealing performance includes a plurality of flaps operated by an actuator for selectively opening and selectively closing a radiator grill installed at the front of a vehicle, a fixed shroud surrounding the outside of the plurality of flaps such that air passing through the radiator grill flows towards the plurality of flaps, the plurality of flaps being fixed to the fixed shroud, and a movable shroud slidably installed on the fixed shroud, the movable shroud being connected to the flaps through an interlocking device and further being slidable toward the front of the vehicle from the fixed shroud by the interlocking device when the flaps are operated.

11 Claims, 5 Drawing Sheets

ACTIVE AIR FLAP ASSEMBLY WITH IMPROVED SEALING PERFORMANCE

CROSS-REFERENCE TO RELATED APPLICATIONS

This application claims the benefit of priority to Korean Patent Application No. 10-2017-0108580, filed on Aug. 28, 2017 with the Korean Intellectual Property Office, the disclosure of which is incorporated herein by reference in its entirety.

TECHNICAL FIELD

Exemplary embodiments of the present disclosure relate to an active air flap that selectively blocks or allows a flow of air introduced into an engine room of a vehicle, and more particularly, to an active air flap assembly with improved sealing performance which is capable of blocking a flow of air from leaking into an engine room, or engine bay, when an active air flap is operated.

BACKGROUND

A variety of methods are applied in order to lessen the air resistance in a running vehicle. Recently, the application of an active air flap has increased, and the active air flap selectively blocks a flow of air into an engine depending on a vehicle speed.

A radiator grill 13 is installed at the front of a vehicle in order to introduce air into an engine room of the vehicle, and the air introduced through the radiator grill 13 is used for cooling various coolers such as a radiator. However, when the vehicle is driven at high speed, a flow of air introduced into the engine room 11 through the radiator grill 13 may act as resistance to the operation of the vehicle.

In order to solve such a problem, an active air flap 120 capable of selectively opening and closing the radiator grill 13 has been recently applied.

As illustrated in FIG. 1, a plurality of flaps 120 and a shroud 130 are installed in the engine room 11. The plurality of flaps 120 are rotated by an actuator, and the shroud 130 is installed outside the flaps 120, and induces air introduced through the radiator grill 13 to the flaps 120. The flaps 120 open or close the radiator grill 13 depending on an operating condition.

In the active air flap according to the related art, however, an end of the shroud 130 is not placed against the radiator grill 13 or a bumper frame 12a having a bumper 12 installed therein. Thus, a flow of air introduced between the end of shroud 130 and the radiator grill 13 or the bumper frame 12a may leak or the introduction of air into the engine room 11 may not be completely blocked. When the active air flap is directly mounted on the radiator grill 13 or the bumper frame 12a, the circumference of the shroud 130 is closely attached to the radiator grill 13 or the bumper frame 12a. In this case, the sealing performance is improved, but the efficiency of the assembling operation is reduced because the weight of the bumper 12 is increased. In order to prevent the reduction in efficiency of the assembling operation, the shroud 130 is not directly mounted on the bumper frame 12a or the radiator grill 13.

For this reason, a space is formed between the circumference of the shroud 130 and the radiator grill 13 or the bumper 12. As indicated by 'L' of FIG. 1, air may leak through the space.

While the active air flaps 120 selectively close the radiator grill, an introduction of air into the engine room 11 must be blocked. However, a flow of air leaking to the circumference of the shroud 130 may be introduced into the engine room 11. In this case, a flow loss may occur, and the active air flap does not normally, or optimally, perform its function.

SUMMARY OF THE DISCLOSURE

Exemplary embodiments of the present disclosure are directed to an active air flap assembly with improved sealing performance, in which a shroud for guiding an air flow is slid toward the front of a vehicle when an active air flap is operated, such that the circumference of the shroud is placed against a radiator grill or bumper, thereby blocking an air flow from leaking along the circumference of the shroud.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with exemplary embodiments of the present disclosure, there is provided an active air flap assembly with improved sealing performance, including: a plurality of flaps operated by an actuator so as to open/close a radiator grill installed at the front of a vehicle; a fixed shroud surrounding the outside of the plurality of flaps such that air passing through the radiator grill flows to the plurality of flaps, wherein the plurality of flaps are fixed to the fixed shroud; and a movable shroud slidably installed on the fixed shroud, connected to the flaps through an interlocking device, and slid toward the front of the vehicle from the fixed shroud by the interlocking device when the flaps are operated.

The fixed shroud and the movable shroud may be formed in a box shape of which front and rear ends are opened, and the movable shroud and the fixed shroud may be installed in a telescopic manner, such that the movable shroud is slid with respect to the fixed shroud.

The active air flap assembly may further include stoppers formed at the circumference of the front end of the fixed shroud and the circumference of the rear end of the movable shroud, respectively, in order to restrict a separation of the movable shroud from the fixed shroud.

The interlocking device may include one or more links installed between the flaps and the movable shroud.

The active air flap assembly may further include: a first link integrated with one side of each of the flaps, and rotated with the flap when the flap is rotated; and a second link installed between the first link and the movable shroud, having both ends connected to the first link and the movable shroud, respectively, and sliding the movable shroud when the first link is rotated.

The fixed shroud may have a guide device for guiding the movable shroud to slide.

The guide device may include guides protruding from the inner surface of the fixed shroud through the movable shroud, and formed along the sliding direction of the movable shroud, and the movable shroud may have slits through which the respective guides are installed, the slits being formed along the sliding direction of the movable shroud.

The active air flap assembly may further include a slider formed at a connection portion between the movable shroud and the second link, and slid along the guides when the movable shroud is slid. The front end of the second link may be connected to the slider.

The guides may be in contact with the upper and lower ends of the slider, respectively.

The active air flap assembly may further include a sealing member installed at the circumference of the front end of the movable shroud, and sealing a space between the circumference of the front end of the movable shroud and the radiator grill or the bumper.

The sealing member may be formed of rubber.

DETAILED DESCRIPTION

Figure 1:
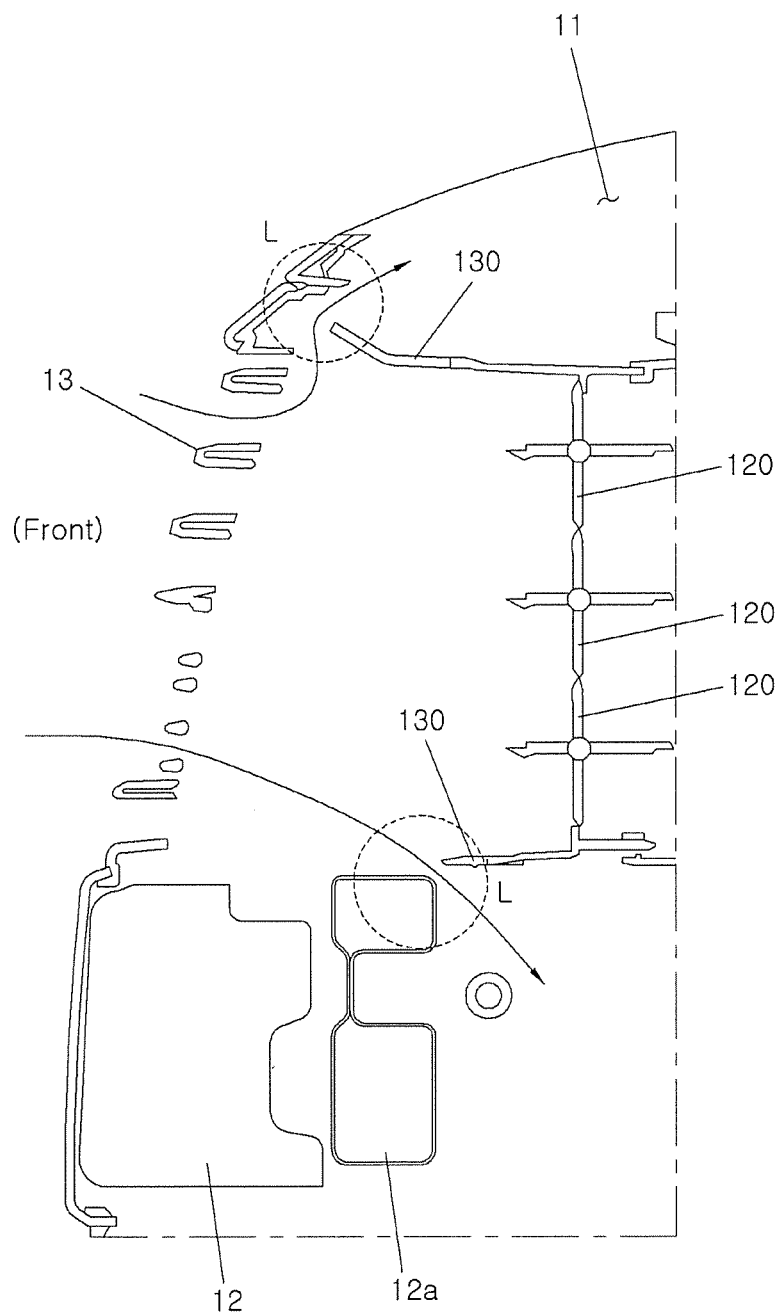
FIG. 1 is a cross-sectional view illustrating an active air flap according to the related art.

Hereafter, an active air flap assembly with improved sealing performance in accordance with exemplary embodiments of the present disclosure will be described below in more detail with reference to the accompanying drawings.

The active air flap assembly with improved sealing performance in accordance with exemplary embodiments of the present disclosure includes a plurality of flaps 21, a fixed shroud 31 and a movable shroud 41. The plurality of flaps 21 are operated by an actuator 22 in order to open/close, or selectively open and close, a radiator grill 13 installed at the front of a vehicle. The fixed shroud 31 surrounds the outside of the plurality of flaps 21 such that air passing through the radiator grill 13 flows to the plurality of flaps 21, and the plurality of flaps 21 are fixed to the fixed shroud 31. The movable shroud 41 is slidably installed on the fixed shroud 31, and connected to the flaps 21 through an interlocking device. When the flaps 21 are operated, the movable shroud 41 is slid toward the front of the vehicle from the fixed shroud 31 by the interlocking device.

The flaps 21 are installed to open/close, or selectively open and close, the radiator grill 13 installed at the front of the vehicle. The flaps 21 are formed in the shape of a plate in the widthwise direction of the vehicle, and open/close, or selectively open and close the radiator grill 13 while rotating about a rotating shaft formed in the widthwise direction of the vehicle.

The plurality of flaps 21 are installed along the top-to-bottom direction of the vehicle. At one side of the flaps 21, an actuator 22 can be installed to rotate the flaps 21. At this time, a plurality of actuators 22 may be installed at the respective flaps 21, and driven at the same time. Thus, the plurality of flaps 21 may be simultaneously operated to open/close, or selectively open and close, the radiator grill 13.

Alternatively, only one actuator 22 may be installed, and connected to the flaps 21 through a connection link 25. Thus, the flaps 21 may be simultaneously operated to open/close the radiator grill 13.

The shroud may be installed outside the flaps 21 in order to guide air introduced through the radiator grill 13 into the engine room 11. In the present embodiment, the shroud includes the fixed shroud 31 and the movable shroud 41, and the movable shroud 41 is slidably installed on the fixed shroud 31.

The fixed shroud 31 surrounds the flaps 21, and guides air introduced through the radiator grill 13 into the engine room 11. The fixed shroud 31 is formed in a cylindrical shape. Desirably, the fixed shroud 31 may be formed in a box shape of which the front and rear ends are opened.

The movable shroud 41 is slidably installed on the fixed shroud 31. The movable shroud 41 and the fixed shroud 31 are installed in a telescopic manner, such that the movable shroud 41 is slid with respect to the fixed shroud 31.

The movable shroud 41 is formed in a cylindrical shape, and has the same cross-sectional shape as the fixed shroud 31. The fixed shroud 31 and the movable shroud 41 have a structure in which the outer surface of any one of the fixed shroud 31 and the movable shroud 41 comes in contact with the inner surface of the other one. In some embodiments, the inner surface of the movable shroud 41 comes in contact with the outer surface of the fixed shroud 31.

The fixed shroud 31 and the movable shroud 41 include stoppers 33 and 45 for restricting the movement of the movable shroud 41, respectively. The stoppers 33 and 45 are formed at the circumference of the front end of the fixed shroud 31 and the circumference of the rear end of the movable shroud 41, respectively, and restrict a separation of the movable shroud 41 from the fixed shroud 31.

The movable shroud 41 may have a sealing member 44 installed at the circumference of the front end thereof, the sealing member 44 can be made of rubber. When the movable shroud 41 is advanced to the maximum, the circumference of the front end of the movable shroud 41 is placed against the radiator grill 13 or the bumper 12 such that sealing is achieved by the sealing member 44.

The movable shroud 41 is slid in the longitudinal direction of the vehicle in connection with the operation of the flaps 21. The interlocking device for interlocking the movable shroud 41 with the flaps 21 may include one or more links 23 and 24 installed between the flaps 21 and the movable shroud 41.

Desirably, the interlocking device may include first links 23 integrated with the flaps 21 and second links 24 installed between the first links 23 and the movable shroud 41.

The first links 23 are formed at one side of the flaps 21. Since the first links 23 are integrated with the flaps 21, the first links 23 are rotated with the flaps 21 when the flaps 21 are rotated to close the radiator grill 13. The first links 23 may be formed at an angle of 90 degrees with respect to the flaps 21.

One ends of the second links 24 are connected to ends of the first links 23, and the other ends of the second links 24 are connected to the movable shroud 41. When the first links 23 are rotated, the second links 24 linearly slide the movable shroud 41. The first links 23 and the second links 24 are installed for the respective flaps 21.

The active air flap assembly may include a guide device for guiding the movable shroud 41 to linearly move along the longitudinal direction of the vehicle.

The guide device may include guides 32 formed on the fixed shroud 31. The guides 32 may be directly formed on the fixed shroud 31 or formed so as not to be relatively moved with respect to the fixed shroud 31. For example, the guides 32 may be formed through the movable shroud 41 from the fixed shroud 31. The guides 32 are formed along the sliding direction of the movable shroud 41.

At this time, the movable shroud 41 has slits 42 through which the respective guides 32 are installed. The slit 42, or each slit 42, has a larger length than does the guide 32. When the movable shroud 41 is retreated, the front end of the slit 42 comes in contact with the guide 32. When the movable shroud 41 is advanced, the rear end of the slit 42 comes in contact with the guide 32.

The active air flap assembly may further include sliders 43 formed at portions where the front ends of the second links 24 are hinge-connected to the movable shroud 41. When the movable shroud 41 is slid, the sliders 43 may be slid along the guides 32.

The guide 32 and the slit 42 may be formed at each of the upper and lower ends of one slider 43, such that the slider 43 is slid while the upper and lower ends of the slider 43 come in contact with the respective guides 32.

The operation of the active air flap assembly with improved sealing performance in accordance with exemplary embodiment of the present disclosure will be described as follows.

Figure 2:
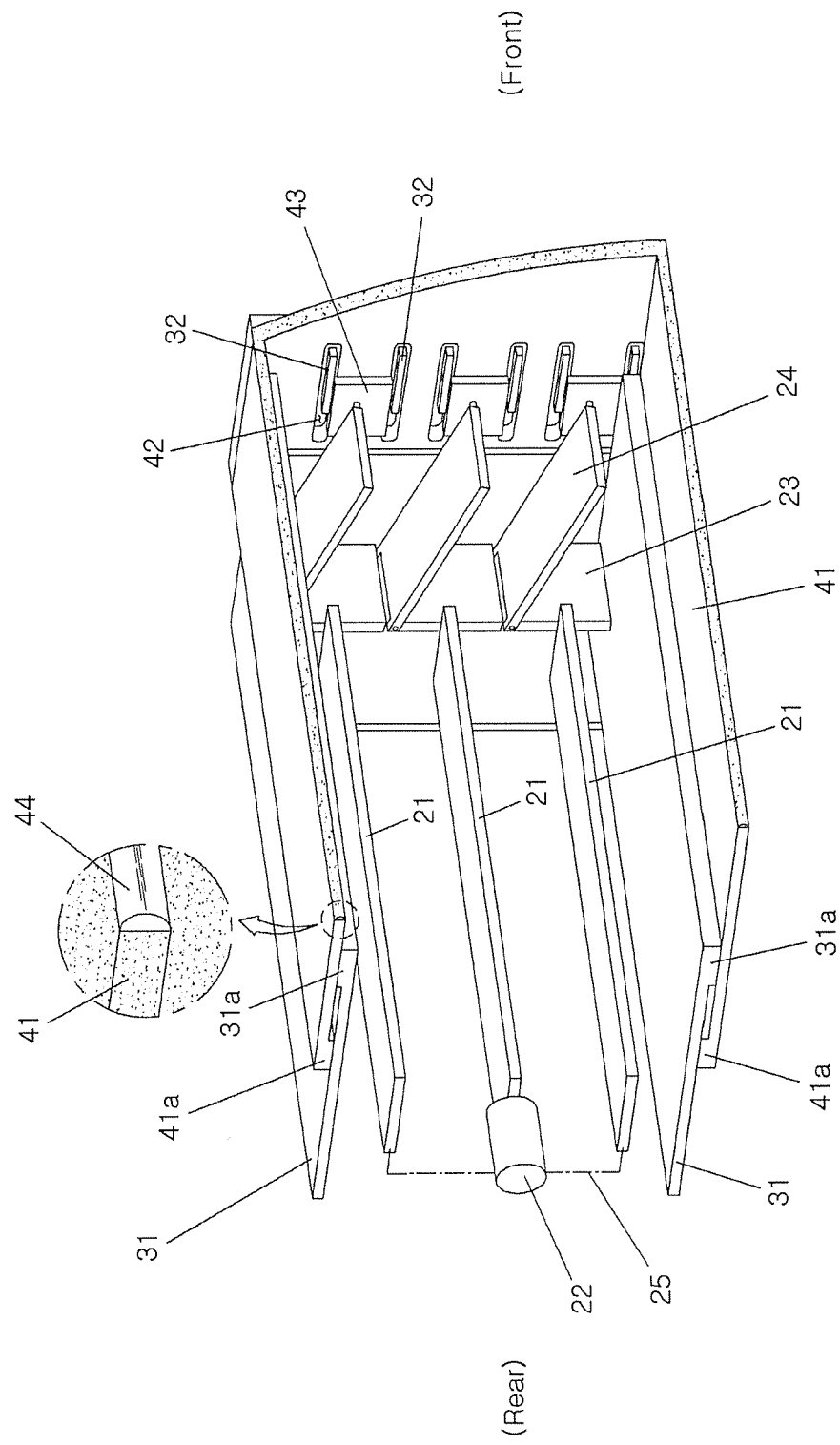
FIG. 2 is a perspective view illustrating an active air flap assembly with improved sealing performance in accordance with exemplary embodiments of the present disclosure as opened.
Figure 3:
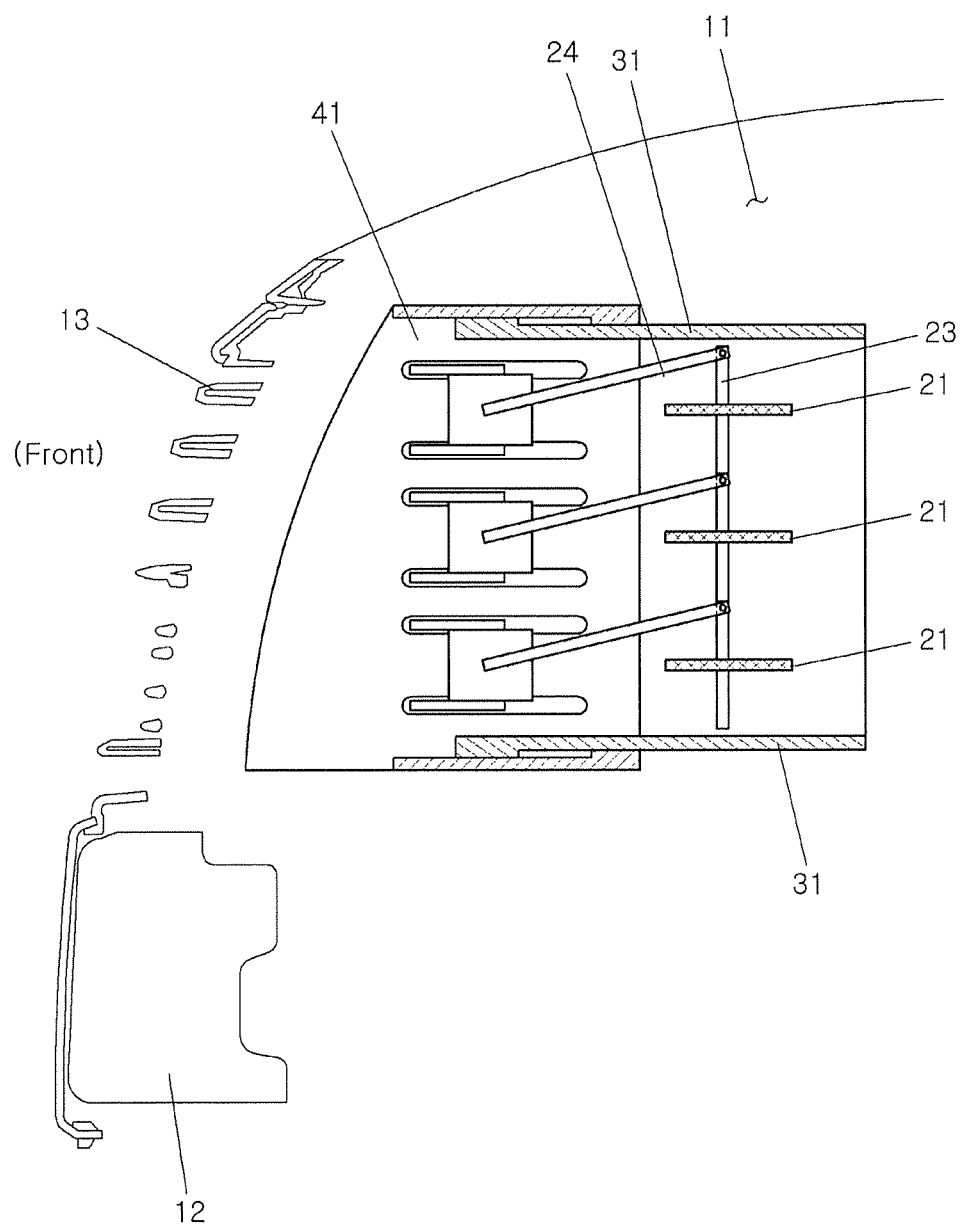
FIG. 3 is a side view illustrating the active air flap assembly with improved sealing performance of FIG. 2 as opened.

FIGS. 2 and 3 illustrate a state where the flaps 21 are opened. Since the flaps 21 are maintained in parallel to the ground, air introduced through the radiator grill 13 is introduced into the movable shroud 41 and the fixed shroud 31, and flows into the engine room 11 through the flaps 21.

While the flaps 21 are opened, the movable shroud 41 is retreated toward the rear of the vehicle. In this state, the circumference of the front end of the movable shroud 41 is not placed against the bumper 12 or the radiator grill 13. Although the circumference of the front end of the movable shroud 41 is not placed against the bumper 12 or the radiator grill 13, air introduced into the movable shroud 41 and the fixed shroud 31 flows into the engine room 11 through the flaps 21. Thus, the movable shroud 41 does not need to be placed against the bumper 12 or the radiator grill 13.

Since the circumference of the front end of the movable shroud 41 is not placed against the bumper 12 or the radiator grill 13, an assembling operation can be easily conducted. That is, since the active air flap assembly in accordance with exemplary embodiments of the present disclosure is not integrated with the bumper 12, the workability of a worker can be improved, compared to when the active air flap assembly is integrated with the bumper 12.

Figure 4:
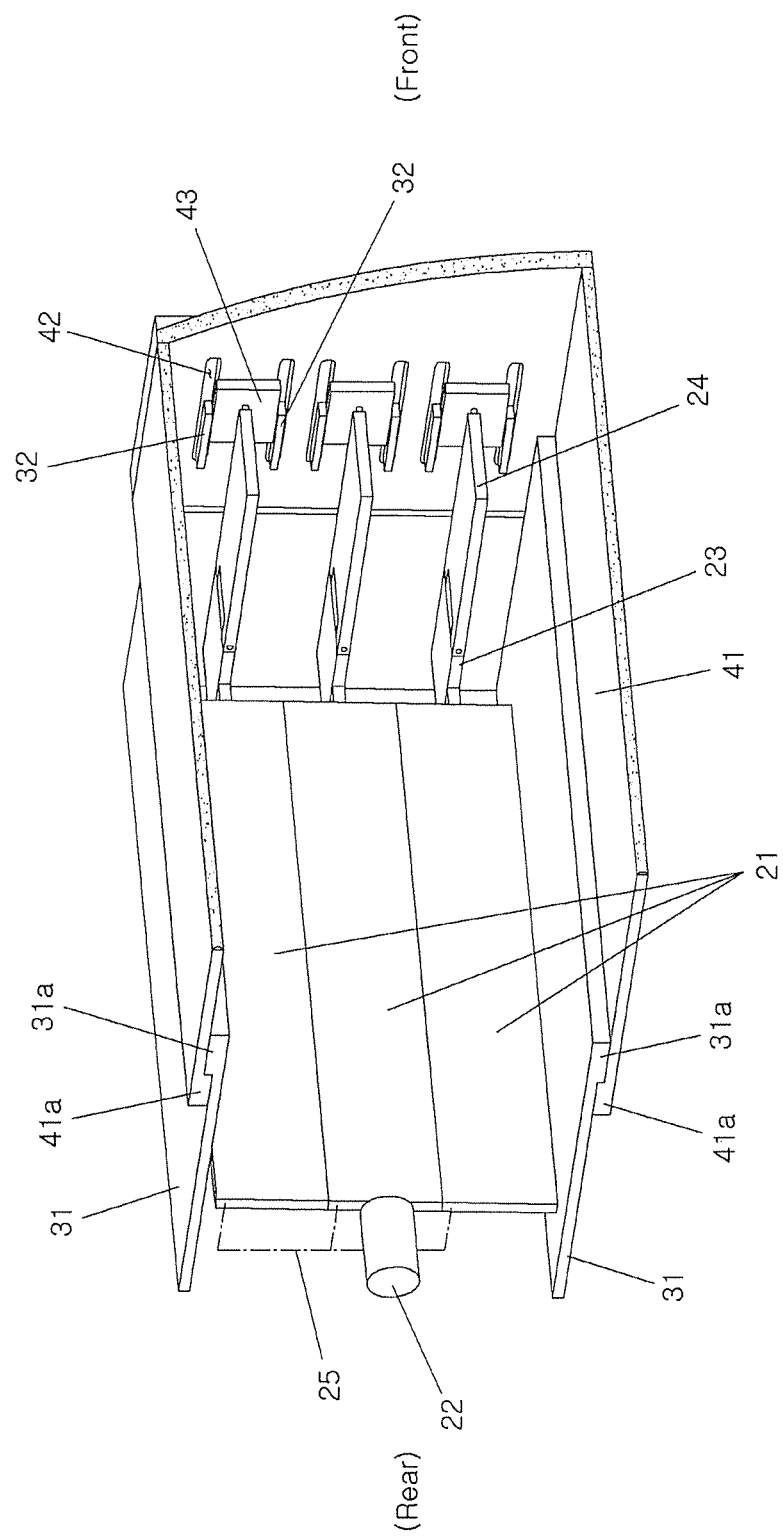
FIG. 4 is a perspective view illustrating that the active air flap assembly with improved sealing performance of FIG. 2 as closed.
Figure 5:
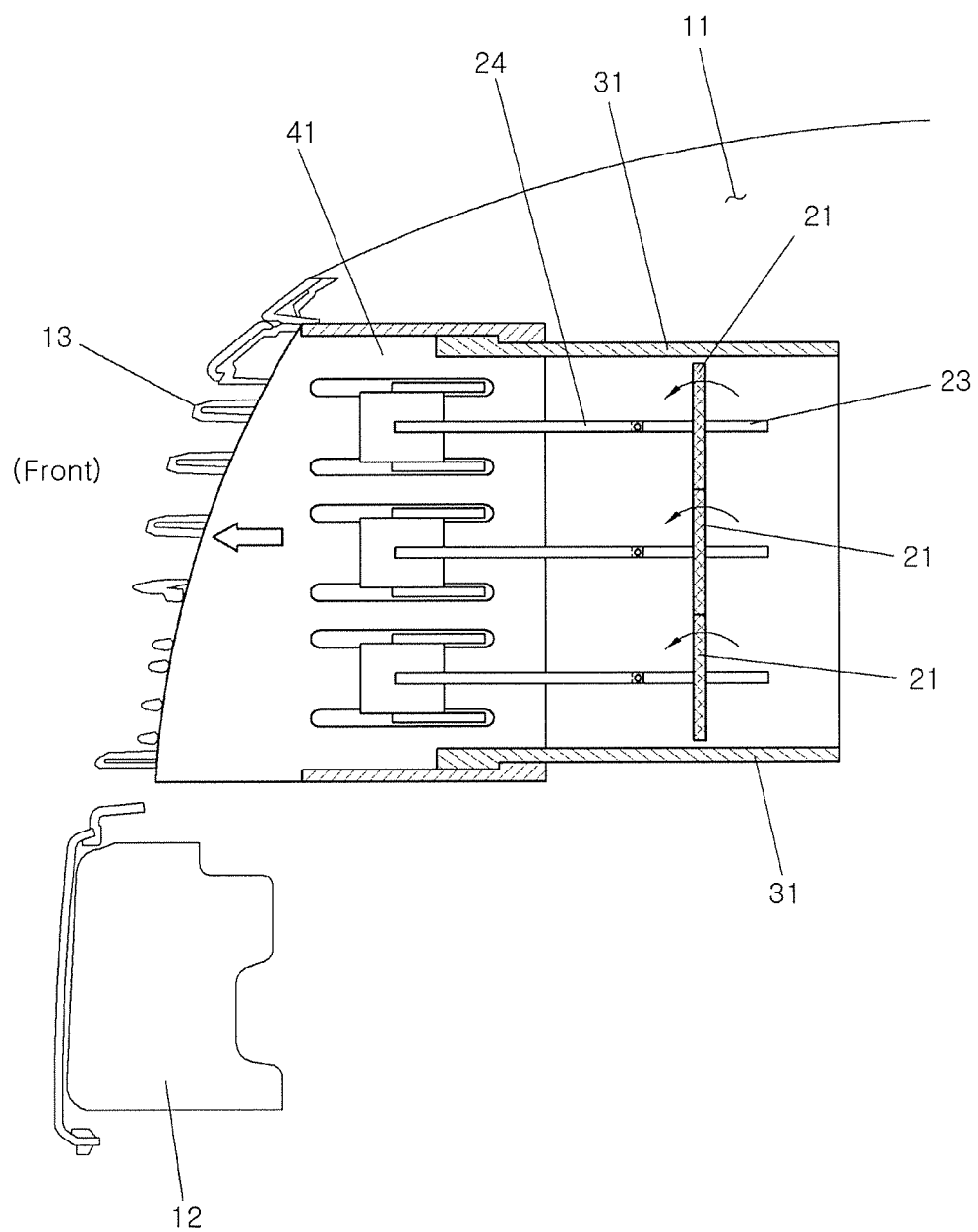
FIG. 5 is a side view illustrating that the active air flap assembly with improved sealing performance of FIG. 2 as closed.

FIGS. 4 and 5 illustrate a state where the flaps 21 are closed. When the flaps 21 are rotated and closed, the movable shroud 41 is advanced in connection with the operation of the flaps 21, and the circumference of the front end of the movable shroud 41 is placed against the bumper 12 and the radiator grill 13, thereby preventing, or substantially preventing, a leakage between the circumference of the front end of the movable shroud 41 and the bumper 12 or the radiator grill 13.

When the flaps 21 are rotated to close the radiator grill 13, the first links 23 integrated with the respective flaps 21 are rotated together.

When the first links 23 are rotated, the second links 24 are rotated to be parallel to the horizontal direction, and the front ends of the second links 24 are moved toward the front of the vehicle.

At this time, the sliders 43 connected to the front ends of the second links 24 are moved toward the front end of the vehicle by the front ends of the second links 24, while advancing the movable shroud 41. When the movable shroud 41 is advanced by the second links 24, the sliders 43 are moved toward the front of the vehicle while being guided by the guides 32.

When the flaps 21 are vertically erected to close the radiator grill 13, the movable shroud 41 is advanced to the maximum.

When the movable shroud 41 is advanced to the maximum, the circumference of the front end of the movable shroud 41 is placed against the radiator grill 13 or the bumper 12. In particular, when the movable shroud 41 is placed against the radiator grill 13 or the bumper 12, the sealing member 44 formed at the circumference of the front end of the movable shroud 41 can prevent, or substantially prevent, an air flow from leaking along the circumference of the movable shroud 41.

Therefore, when the flaps 21 are operated to close the radiator grill 13, a leakage through the circumference of the movable shroud 41 can be prevented, or substantially prevented, which makes it possible to improve aerodynamic performance.

In accordance with the exemplary embodiments of the present disclosure, when the flaps are operated to close the radiator grill, the movable shroud is advanced so that the circumference of the front end of the movable shroud is placed against the radiator grill or the bumper. Thus, an air leakage can be prevented, or substantially prevented, from leaking along the circumference of the shroud.

Furthermore, since an air leakage can be prevented, or substantially prevented, from leaking along the circumference of the shroud, a flow loss can be minimized.

While the present disclosure has been described with respect to the specific embodiments, it will be apparent to those skilled in the art that various changes and modifications may be made without departing from the spirit and scope of the disclosure as defined in the following claims.

What is claimed is:

1. An active air flap assembly with improved sealing performance, comprising:
    a plurality of flaps operated by an actuator for selectively opening and selectively closing a radiator grill installed at a front side of a vehicle;
    a fixed shroud surrounding an outside of the plurality of flaps such that air passing through the radiator grill flows towards the plurality of flaps, the plurality of flaps being fixed to the fixed shroud; and
    a movable shroud slidably installed on the fixed shroud in a front-rear direction of the vehicle, wherein the movable shroud, which is connected to the plurality of flaps through an interlocking device, is configured to slide toward the front side of the vehicle from the fixed shroud by the interlocking device when the plurality of flaps are rotated to close the radiator grill and is configured to slide toward a rear side of the vehicle from the fixed shroud by the interlocking device when the plurality of flaps are rotated to open the radiator grill.

2. The active air flap assembly of claim 1, wherein the fixed shroud and the movable shroud are formed in a box shape of which front and rear ends are opened, and
    the movable shroud and the fixed shroud are disposed in a telescopic manner, such that the movable shroud is slid with respect to the fixed shroud.

3. The active air flap assembly of claim 2, further comprising stoppers disposed at the circumference of the front end of the fixed shroud and the circumference of the rear end of the movable shroud, respectively, the stoppers restricting a separation of the movable shroud from the fixed shroud.

4. The active air flap assembly of claim 1, wherein the interlocking device comprises one or more links installed between the plurality of flaps and the movable shroud.

5. The active air flap assembly of claim 4, further comprising:
   a first link integrated with one side of each of the plurality of flaps, the first link rotating with each of the plurality of flaps when each of the plurality of flaps is rotated; and
   a second link installed between the first link and the movable shroud, the second link having both ends connected to the first link and the movable shroud, respectively, and the second link sliding the movable shroud when the first link is rotated.

6. The active air flap assembly of claim 5, wherein the fixed shroud includes a guide device for guiding the movable shroud to slide.

7. The active air flap assembly of claim 6, wherein the guide device comprises guides protruding from the inner surface of the fixed shroud through the movable shroud and formed along the sliding direction of the movable shroud, and
   the movable shroud including slits through which the respective guides are installed, the slits being formed along the sliding direction of the movable shroud.

8. The active air flap assembly of claim 7, further comprising a slider disposed at a connection portion between the movable shroud and the second link, and slid along the guides when the movable shroud is slid,
   wherein the front end of the second link is connected to the slider.

9. The active air flap assembly of claim 8, wherein the guides are in contact with the upper and lower ends of the slider, respectively.

10. The active air flap assembly of claim 1, further comprising a sealing member installed at the circumference of the front end of the movable shroud, and sealing a space between the circumference of the front end of the movable shroud and the radiator grill or the bumper.

11. The active air flap assembly of claim 10, wherein the sealing member includes rubber.

* * * * *